US012647610B2

(12) United States Patent　　　　　(10) Patent No.:　US 12,647,610 B2
　　　Kang et al.　　　　　　　　　　　(45) Date of Patent:　　　Jun. 2, 2026

(54) METHOD AND APPARATUS FOR VIDEO CODING REFINING PREDICTED SIGNALS OF INTRA PREDICTION BASED ON DEEP LEARNING

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Hye Sun Jeong, Incheon (KR); Seung Wook Park, Yongin-si (KR); Jin Heo, Yongin-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 31 days.

(21) Appl. No.: 18/412,841

(22) Filed: Jan. 15, 2024

(65) Prior Publication Data

US 2024/0155153 A1　　May 9, 2024

Related U.S. Application Data

(63) Continuation of application No. PCT/KR2022/008119, filed on Jun. 9, 2022.

(30) Foreign Application Priority Data

Jul. 13, 2021　(KR) ........................ 10-2021-0091743
Jun. 8, 2022　(KR) ........................ 10-2022-0069466

(51) Int. Cl.
　　*H04N 19/184*　　　(2014.01)
　　*H04N 19/176*　　　(2014.01)
　　*H04N 19/593*　　　(2014.01)

(52) U.S. Cl.
　　CPC ......... *H04N 19/593* (2014.11); *H04N 19/176* (2014.11); *H04N 19/184* (2014.11)

(58) Field of Classification Search
　　CPC .............. H04N 19/593; H04N 19/176; H04N 19/184; H04N 19/105; H04N 19/11;
　　　　　　　　　　(Continued)

(56) References Cited

U.S. PATENT DOCUMENTS 11,115,673 B2　　9/2021　Yang
11,265,540 B2 *　3/2022　Na ........................ H04N 19/117
　　　　　　　　(Continued)

FOREIGN PATENT DOCUMENTS

KR　　20190043930 A　　4/2019
KR　　20200000548 A　　1/2020
　　　　　　(Continued)

OTHER PUBLICATIONS

Wenxue Cui et al., (hereinafter Cui) "Convolutional Neural Networks based Intra Prediction for HEVC", Harbin Institute of Technology, Harbin, China; arXiv—2018 (Year: 2018).*

(Continued)

*Primary Examiner* — Dramos Kalapodas
(74) *Attorney, Agent, or Firm* — Lempia Summerfield Katz LLC

(57)　　　　　ABSTRACT

A method and an apparatus are disclosed for video coding for refining predicted signals of intra prediction based on deep learning. The video coding method and the apparatus generate a refined intra predicted signal to improve video coding efficiency and video quality. The video coding method and the apparatus adaptively input a prediction (Continued)

block according to intra prediction of a current block, block information related to the current block, and neighboring reconstructed reference samples into a deep learning network.

14 Claims, 19 Drawing Sheets

(58) Field of Classification Search
CPC .... H04N 19/124; H04N 19/13; H04N 19/132; H04N 19/52; H04N 21/4666; G06N 3/08; G06T 9/00
See application file for complete search history.

(56) References Cited

U.S. PATENT DOCUMENTS

| | | | | |
|---|---|---|---|---|
| 11,363,302 B2 * | 6/2022 | Su | | H04N 19/82 |
| 11,544,606 B2 * | 1/2023 | Mandt | | G06N 3/088 |
| 11,610,283 B2 | 3/2023 | Jung | | |
| 11,622,119 B2 * | 4/2023 | Hannuksela | | H04N 19/159 |
| | | | | 375/240.02 |
| 11,694,125 B2 | 7/2023 | Yang | | |
| 11,924,406 B2 * | 3/2024 | Zhao | | H04N 19/105 |
| 12,034,921 B2 * | 7/2024 | Na | | G06N 3/045 |

| | | | |
|---|---|---|---|
| 2019/0124348 A1 | 4/2019 | Yang | |
| 2020/0213587 A1 | 7/2020 | Galpin | |
| 2020/0311870 A1 | 10/2020 | Jung | |
| 2022/0007045 A1 | 1/2022 | Yang | |
| 2022/0046236 A1 | 2/2022 | Li | |
| 2022/0394308 A1 * | 12/2022 | Li | H04N 19/82 |
| 2023/0171421 A1 * | 6/2023 | Galpin | H04N 19/577 |
| | | | 375/240.16 |
| 2023/0388490 A1 * | 11/2023 | Liu | H04N 19/70 |
| 2024/0031611 A1 * | 1/2024 | Galpin | H04N 19/85 |

FOREIGN PATENT DOCUMENTS

| | | |
|---|---|---|
| KR | 20200040773 A | 4/2020 |
| KR | 20200114436 A | 10/2020 |
| KR | 20210024624 A | 3/2021 |

OTHER PUBLICATIONS

Yang Wang et al., (hereinafter Wang) "Multi-Scale Convolutional Neural Network-Based Intra Pradiction for Video Coding", 1051-8215 © 2019 IEEE (Year: 2019).*

International Search Report and Written Opinion cited in corresponding international patent application No. PCT/KR2022/008119; Sep. 26, 2022; 13 pp.

* cited by examiner

Vertical prediction    r×(w+r)

(h+r)×(w+r)    h×w

Refinement model

Horizontal prediction    (h+r)×r (h+r)×(w+r)    h×w

Refinement model

☐ Prediction block    ☐ Reconstructed reference samples

Vertical prediction $(h+r_h) \times (w+r_w)$

Horizontal prediction $(h+r_h) \times (w+r_w)$

☐ Prediction block        ☐ Reconstructed reference samples

METHOD AND APPARATUS FOR VIDEO CODING REFINING PREDICTED SIGNALS OF INTRA PREDICTION BASED ON DEEP LEARNING

CROSS-REFERENCE TO RELATED APPLICATIONS

This application is a continuation of International Application No. PCT/KR2022/008119 filed on Jun. 9, 2022, which claims priority to and the benefit of Korean Patent Application No. 10-2021-0091743, filed on Jul. 13, 2021, and Korean Patent Application No. 10-2022-0069466, filed on Jun. 8, 2022, the entire disclosures of each of which are incorporated herein by reference.

TECHNICAL FIELD

The present disclosure relates to a video coding method and an apparatus for refining predicted signals of intra prediction based on deep learning.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

For a current block in a video to be encoded, in the existing intra prediction method, a prediction block is generated from neighboring reconfigured reference samples based on fixed rules, and therefore, it may be difficult to generate a prediction block of complex content. In addition, since the amount of information that may be used as reference samples is less than temporal neighboring information, the intra prediction method has lower coding performance than that of the inter prediction method. Therefore, a filter or deep learning technology may be used to reduce difference signals with the original block by improving the prediction block.

As a conventional technique using a filter, there is a method of generating a prediction block of a current block using a fixed rule and then filtering the prediction block using a filter. Intra prediction methods using fixed rules use only limited information and thus may not be suitable for processing complex content as described above. For example, a directional mode of intra prediction does not use reference samples in directions other than a selected direction. To solve this problem, filtering may be applied to the prediction block. However, when filtering is performed using a fixed filter, there is a problem in that information of neighboring reference samples and the entire prediction block cannot be considered.

As other technologies, there are intra prediction methods of generating a prediction block upon receiving neighboring reference samples using deep learning technology by replacing the intra prediction according to fixed rules and a filter. These technologies propose a deep learning network for generating an elaborate prediction block using neighboring reference samples as input. Thus, the deep learning-based prediction method may be added as one of the intra prediction modes in a video coding device or replace all intra prediction modes. However, since the deep learning-based prediction method do not utilize information of prediction blocks according to the existing intra prediction, there is a problem in that a generated predicted signal may not be accurate. For example, a prediction block generated according to a directional mode of the existing intra prediction is predicted based on directionality, so it may be used as approximate structural information of a current block, but deep learning-based prediction methods do not utilize such information.

As another technology, there is a deep learning-based prediction method that uses neighboring reference samples and blocks predicted in the directional mode, while using the deep learning technology. Although there is a refinement in using information of prediction blocks in addition to reference samples, this method also has the disadvantage of not being adaptive to information related to reference samples and prediction blocks and requiring additional signaling for indicating application of the method.

Therefore, in order to improve video coding efficiency and improve video quality by improving prediction blocks, a deep learning-based intra prediction method that uses neighboring reference samples and prediction blocks together is utilized. In addition, there is a need to consider ways to adaptively use information related to reference samples and prediction blocks.

SUMMARY

The present disclosure seeks to provide a video coding method and an apparatus for generating a refined intra predicted signal to improve video coding efficiency and video quality. The video coding method and the apparatus adaptively may input a prediction block according to intra prediction of a current block, block information related to the current block, and neighboring reconstructed reference samples into a deep learning network.

At least one aspect of the present disclosure provides a video decoding device. The video decoding device includes an entropy decoder configured to decode information of a current block from a bitstream and residual values of the current block. The information of the current block includes an intra prediction mode of the current block, a height, a width or an aspect ratio of the current block, a color of the current block, a type of picture in which the current block is included, and a quantization parameter of the current block. The video decoding device also includes an intra predictor configured to generate a prediction block for the current block from reconstructed reference samples around the current block using the intra prediction mode. The video decoding device also includes a predicted signal refinement unit configured to adaptively select a deep learning-based refinement model based on all or some of the information of the current block and input an input block including the prediction block and the reconstructed reference samples into the selected deep learning-based refinement model to generate a refined prediction block. The video decoding device also includes an adder configured to add the residual values to the refined prediction block to generate a reconstructed block of the current block.

Another aspect of the present disclosure provides a video decoding method of performing intra-prediction on a current block, performed by a video decoding apparatus. The video decoding method includes decoding information of a current block from a bitstream and residual values of the current block. The information of the current block includes an intra prediction mode of the current block, a height, a width or an aspect ratio of the current block, a color of the current block, a type of picture in which the current block is included, and a quantization parameter of the current block. The video decoding method also includes generating a prediction block for the current block from reconstructed reference samples around the current block using the intra prediction mode. The video decoding method also includes adaptively selecting a deep learning-based refinement model based on all or some of the information of the current block and generate a refined prediction block by inputting an input block including the prediction block and the reconstructed reference samples into the selected deep learning-based refinement model. The video decoding method also includes generating a reconstructed block of the current block by adding the residual values to the refined prediction block.

Yet another aspect of the present disclosure provides a video encoding method of performing intra-prediction on a current block, performed by a video decoding apparatus. The video encoding method includes obtaining information of the current block from a high level. The information of the current block includes an intra prediction mode of the current block, a height, a width or an aspect ratio of the current block, a color of the current block, a type of picture in which the current block is included, and a quantization parameter of the current block. The video encoding method also includes generating a prediction block for the current block from reconstructed reference samples around the current block using the intra prediction mode. The video encoding method also includes adaptively selecting a deep learning-based refinement model based on all or some of the information of the current block and generating a refined prediction block by inputting an input block including the prediction block and the reconstructed reference samples into the selected deep learning-based refinement model. The video encoding method also includes generating a residual block by subtracting the refined prediction block from the current block.

As described above, the present disclosure provides a video coding method and an apparatus for generating a refined intra predicted signal by adaptively inputting a prediction block according to intra prediction of a current block, block information related to the current block, and neighboring reconstructed reference samples into a deep learning network. Thus, the video coding method and the apparatus may improve video coding efficiency and video quality.

DETAILED DESCRIPTION

Figure 1:
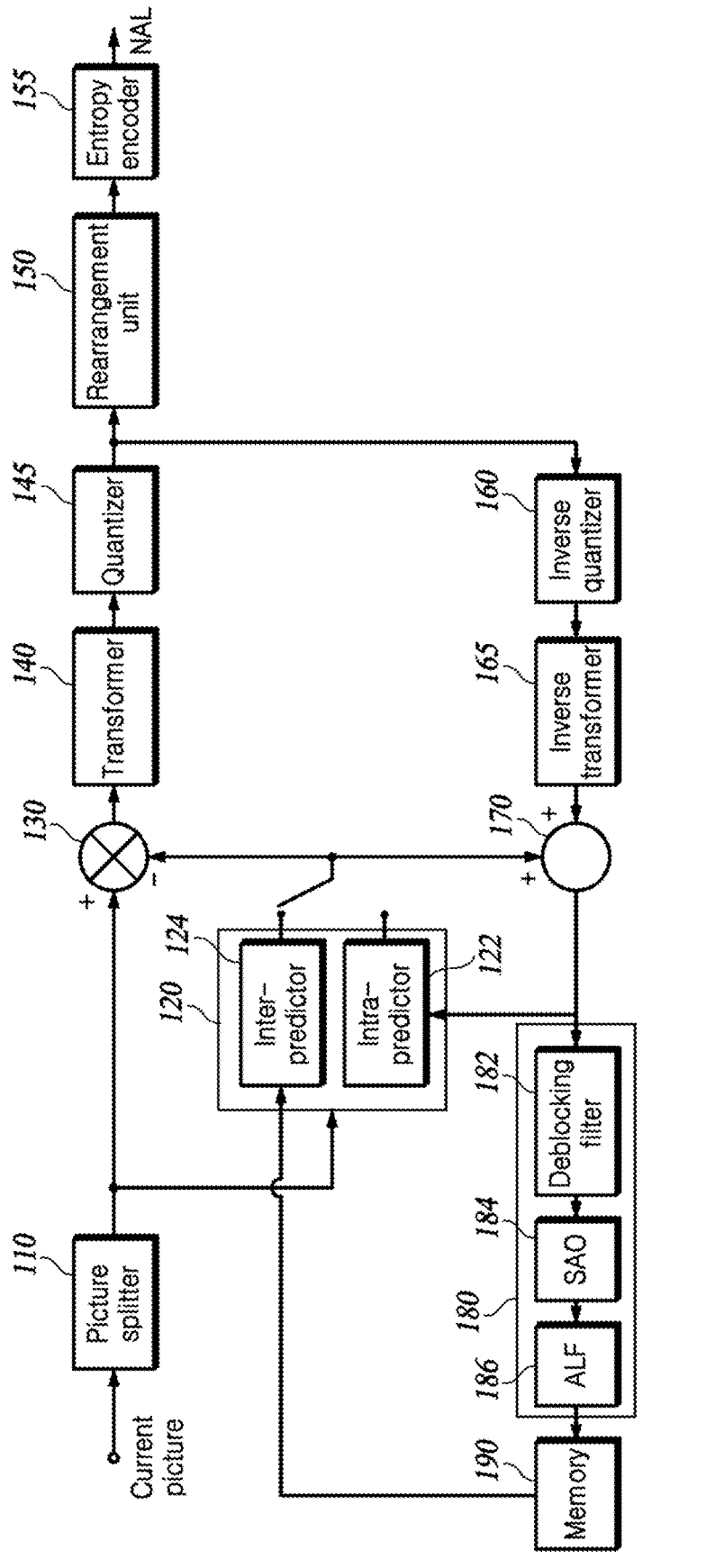
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
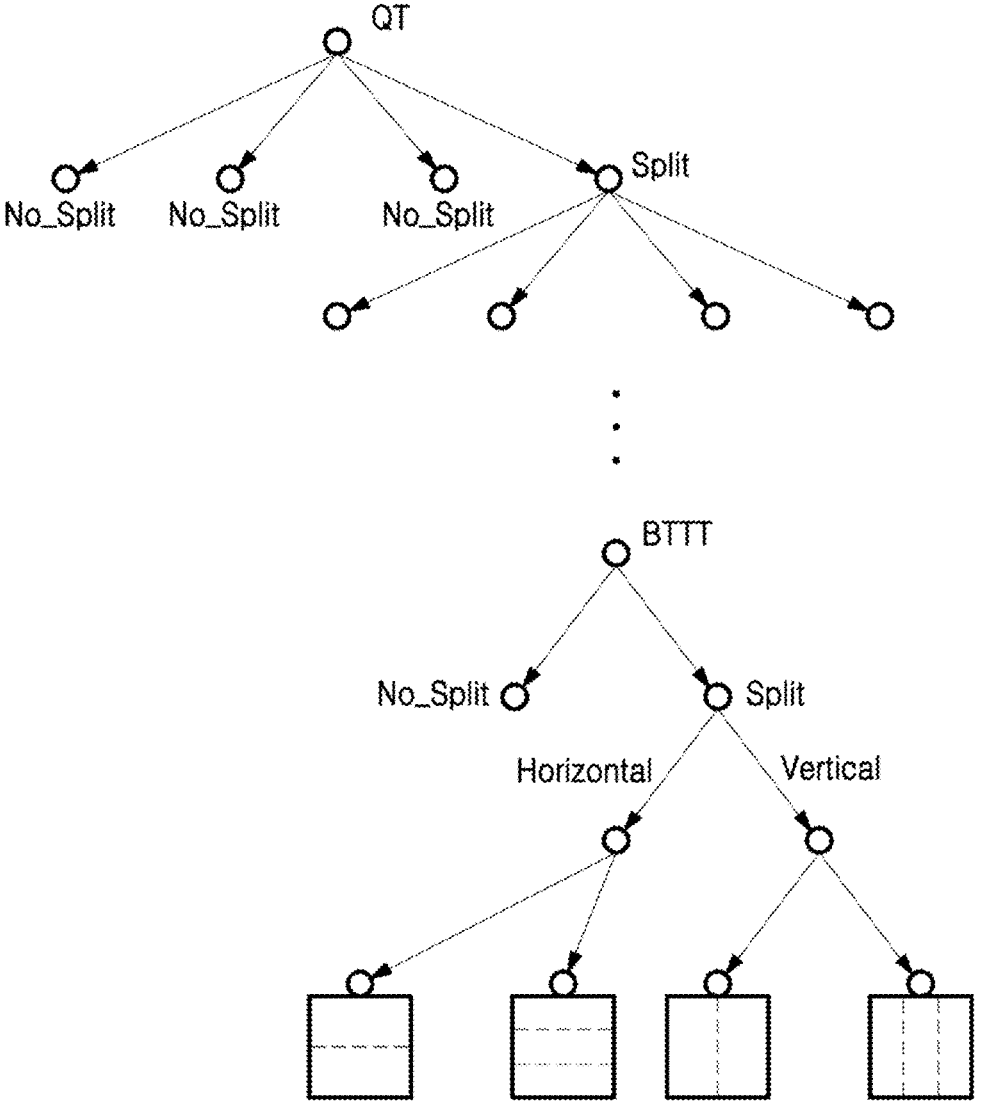
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
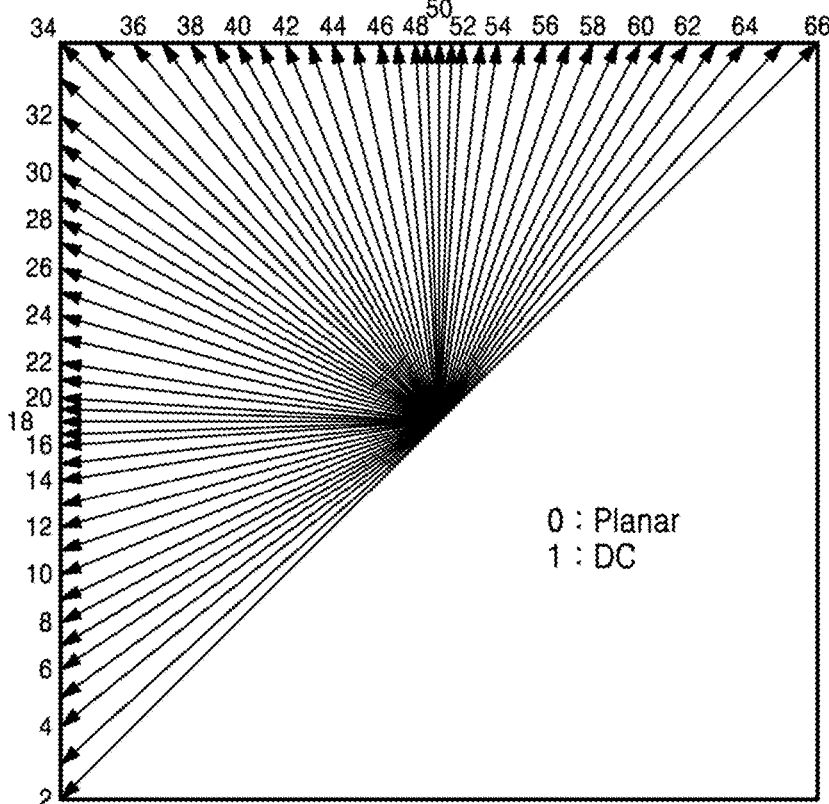
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
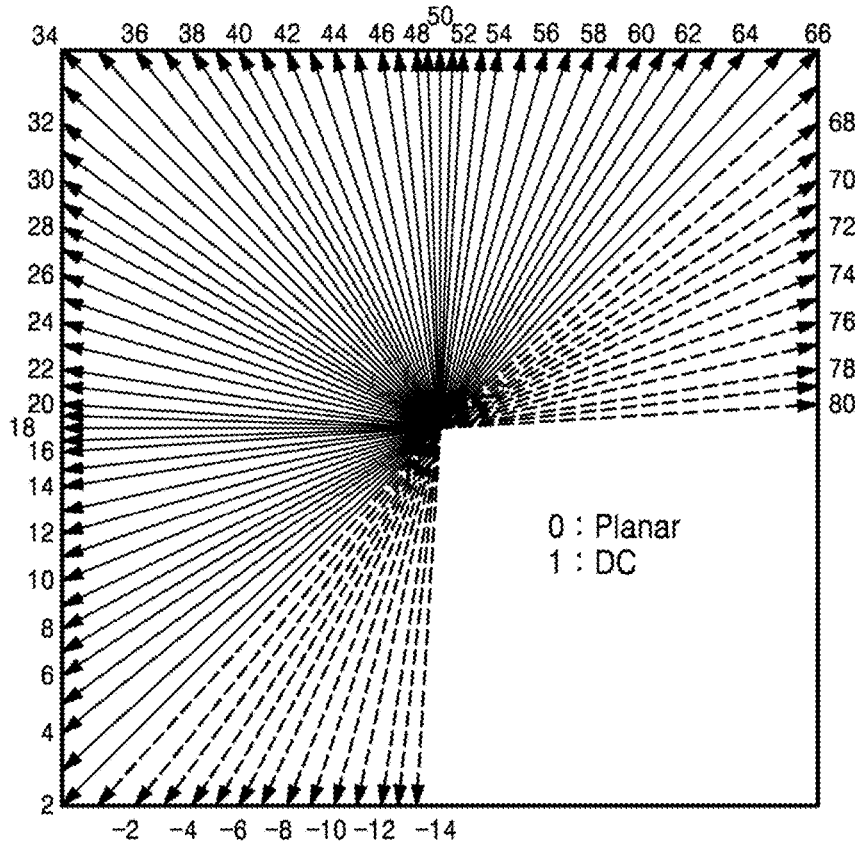

For efficient directional prediction for the current block having a rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than -135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
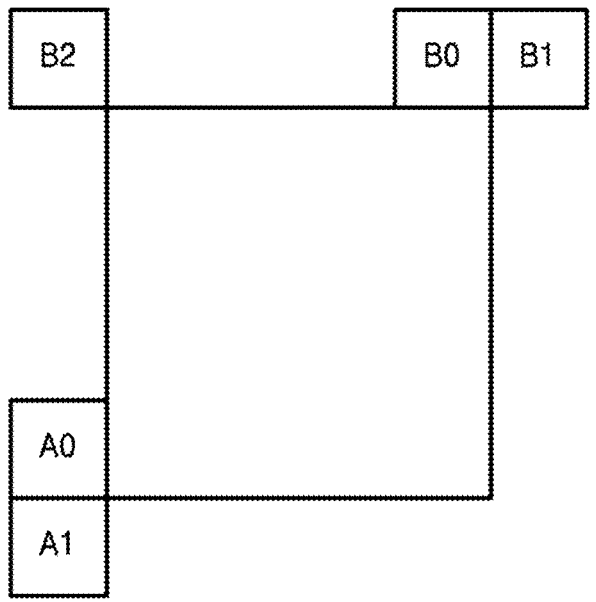
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
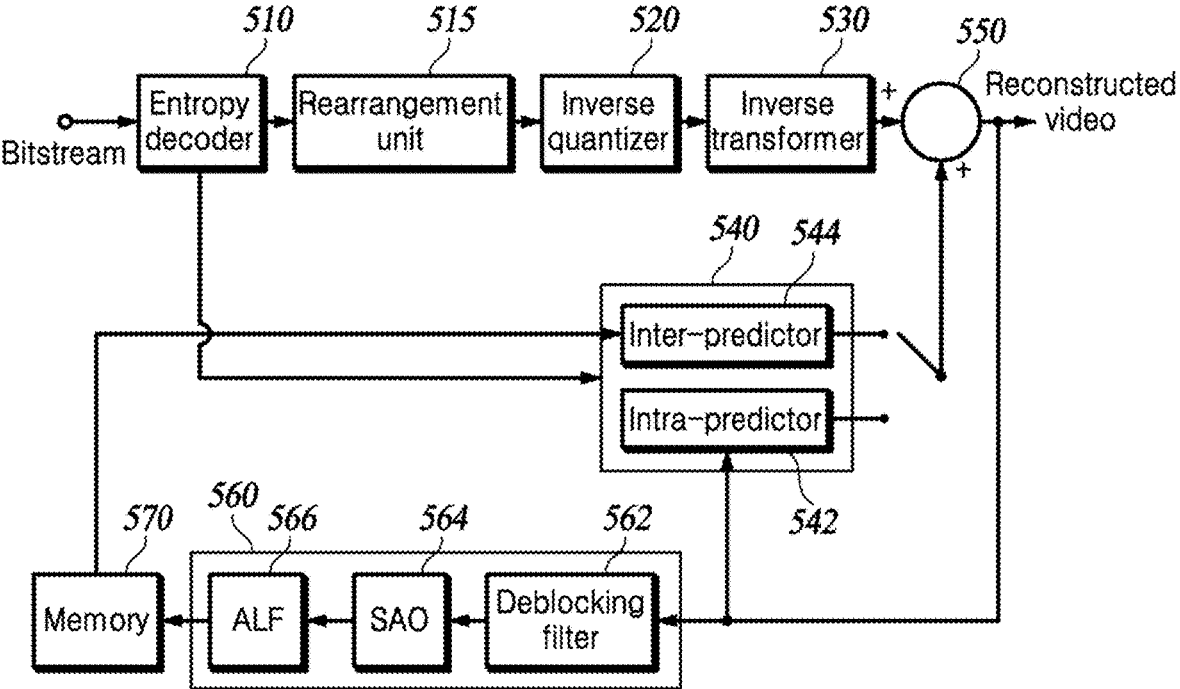
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for generating a refined intra predicted signal by adaptively inputting a prediction block according to intra prediction of a current block, block information related to the current block, and neighboring reconstructed reference samples into a deep learning.

The following embodiments may be commonly applied to video encoding device and parts that use deep learning technology of video encoding device.

In the following description, the term 'target block' to be encoded or decoded may be used in the same sense as the current block or coding unit (CU) as described above, or the 'target block' may mean a partial region of the coding unit.

In addition, the aspect ratio of a block is defined as a value obtained by dividing a horizontal length of a block by a vertical length.

I. Intra Prediction Mode

As described above, intra prediction is a method of predicting a current block by referring to samples existing around the block to be currently encoded. In Versatile Video Coding (VVC) technology, the intra prediction mode has finely divided directional modes (i.e., 2 to 66) in addition to the non-directional modes (i.e., planar and DC), as illustrated in FIG. 3A. In addition, as added to the example of FIG. 3B, the intra prediction mode of the luma block has directional modes (−14 to −1 and 67 to 80) according to wide-angle intra prediction (WAIP). In such intra prediction, a prediction block according to the directional mode may express approximate structural information of the current block.

In addition, intra prediction may use prediction technology, such as multiple reference line intra prediction (MRLP), cross-component linear model (CCLM), position dependent intra prediction combination (PDPC), intra subpartitions (ISP), matrix-based intra prediction (MIP), etc.

In an intra prediction process using MRLP, a video encoding/decoding device may use more reference lines by using multiple reference line (MRL). When the MRL is applied, the video encoding/decoding device may perform intra prediction on the current block using samples of two lines added to the top and left of the current block in addition to the original reference line. To select a reference line when applying the MRL, an index (mrl_idx) indicating the reference line may be signaled to the video decoding device.

CCLM prediction is an intra prediction method that uses a linear model representing similarity between luma signals and chroma signals. To activate the CCLM mode, the video encoding device may signal a flag activating the CCLM mode to the video decoding device.

In the CCLM prediction, first, a linear transformation function between neighboring reference samples of the current chroma block and luma signal reference samples existing at the same location as those of the neighboring reference samples is derived. Here, a linear transformation function may be derived based on the minimum value of a neighboring luma signal, a chroma value at the same location as the peripheral luma signal, the maximum value of the neighboring luma signal, and a chroma value at the same location as the peripheral luma signal. Next, prediction of chroma samples is performed by applying the linear transformation function to luma samples at the same location as the chroma block.

In intra prediction, one of the rule-based prediction methods is position dependent intra prediction combination (PDPC). In other words, a predictor may be generated based on a predefined operation by utilizing encoding information of a target block on which intra prediction is performed and neighboring pixels spatially adjacent to the target block.

The PDPC modifies prediction samples generated according to a specific intra prediction mode to generate an intra predictor of the current block. Here, the specific intra prediction mode includes, among the prediction modes illustrated in FIG. 3A, planar, DC, horizontal (prediction mode #18), vertical (prediction mode #50), bottom-left diagonal directional mode (prediction mode #2) and 15 directional modes close thereto, and a top-right diagonal directional mode (prediction mode #66) and 15 directional modes close thereto.

In the PDPC, for prediction samples of the current block generated according to a specific intra prediction mode, the values for each pixel may be adjusted using predefined weights and location information of neighboring pixels to generate prediction samples.

The ISP technology subdivides the current block into small blocks of the same size and then shares the intra prediction mode of the current block across all subblocks. However, the ISP technology may apply a different transform to each subblock. In the case of subdividing, a block may be divided horizontally or vertically.

A predictor may be generated based on a predefined matrix operation using neighboring pixels of the current block on which intra prediction is performed and encoding information of the current block. This rule-based prediction method is called MIP.

The MIP generates the entirety or a portion of the intra predictor by using a predefined matrix operation. When a portion of the predictor is generated, the MIP may generate final intra prediction samples equal to the size of the current block by additionally performing upsampling or interpolation for upscaling using the portion of the predictor.

Meanwhile, the MIP may selectively select some of the pixels spatially adjacent to the current block and may use them as neighboring pixels of the current block. In another embodiment, the MIP may use values derived according to an operation based on methods, such as subsampling, downscaling, etc. for a matrix operation.

Most probable mode (MPM) technology uses the intra prediction mode of neighboring blocks during intra prediction of the current block. The video encoding device may improve the coding efficiency of the intra prediction mode by transmitting an index of an MPM list instead of an index of the prediction mode.

Meanwhile, intra block copy (IBC) is a technology that generates a reference block in the same picture as a prediction block of the current block instead of using reference samples when performing intra prediction. Here, a block vector is a displacement indicating a reference block and is signaled from the video encoding device to the video decoding device.

II. Predicted Signal Refinement of Intra Prediction

Figure 6:
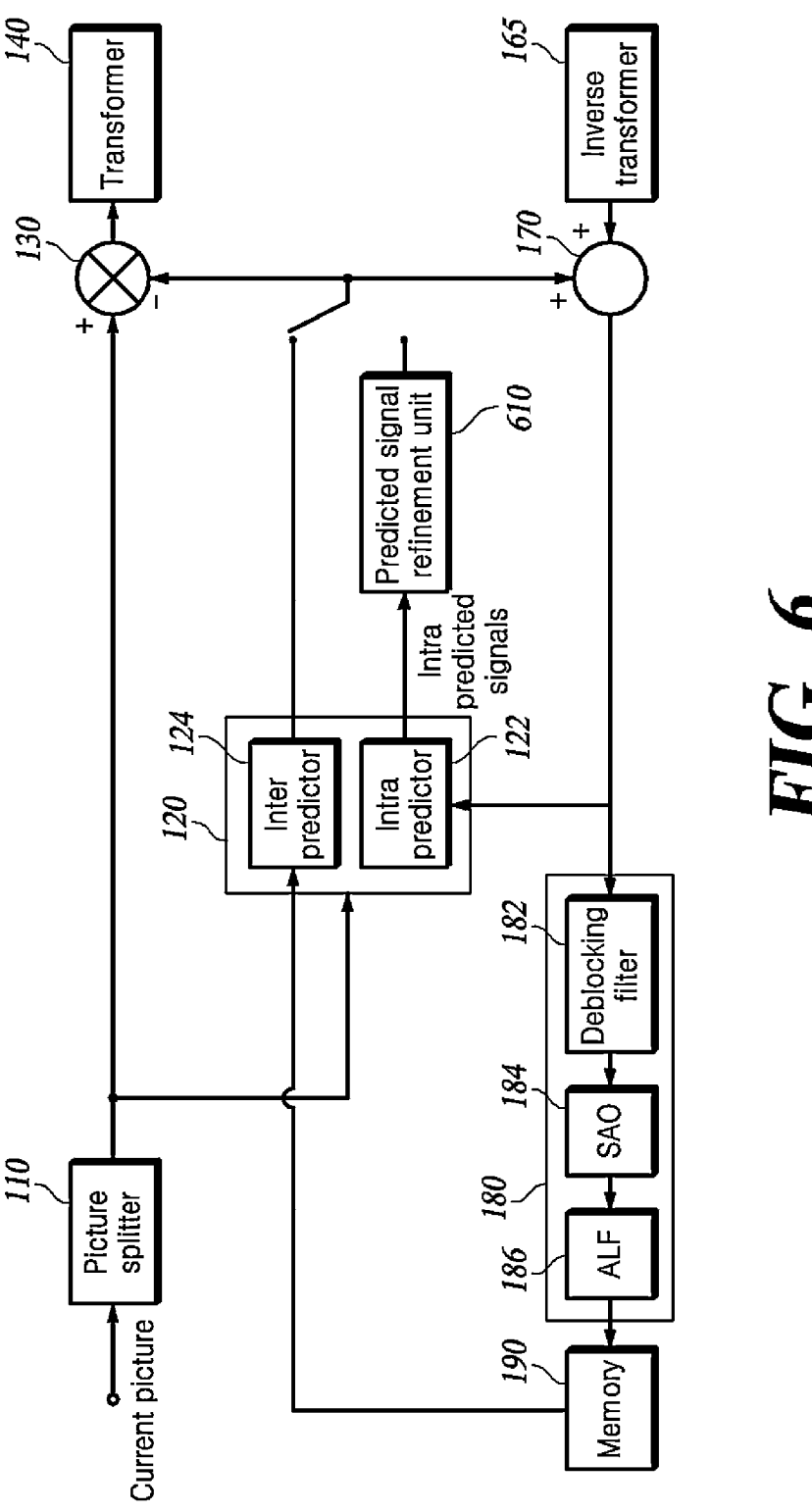
FIG. 6 is an illustrative block diagram of a video encoding device using refinement of an intra predicted signal, according to an embodiment of the present disclosure.

FIG. 6 is an illustrative block diagram of a video encoding device using refinement of an intra predicted signal, according to an embodiment of the present disclosure.

The video encoding device according to the present embodiment additionally includes a predicted signal refinement unit 610 at the rear of the intra predictor 122, which is an existing component. Here, the components included in the video encoding device according to the present embodiment are not necessarily limited thereto. For example, the video encoding device may additionally include a training unit (not shown) for training a deep learning-based refinement model included in the predicted signal refinement unit 610 or may be implemented in a form linked to an external training unit.

The intra predictor 122 generates a prediction block including predicted signals for the current block from neighboring reference samples using an intra prediction mode for the current block to be encoded.

The predicted signal refinement unit 610 generates a refined prediction block from the prediction block and neighboring reconstructed reference samples by using a refinement model. Meanwhile, the training unit may train the refinement model so that the refinement model may learn a refined signal generating method to generate refined signals that are close to the original signals of the current block.

Hereinafter, the term refined prediction block may be used interchangeably with the term 'refined block'. In addition, reconstructed reference samples may be used interchangeably with 'reconstructed reference samples'.

The video encoding device generates a residual block by subtracting the refined block from the current block. The video encoding device may input residual values of the residual block to the transformer 140 and may perform the encoding process as described above.

Figure 7:
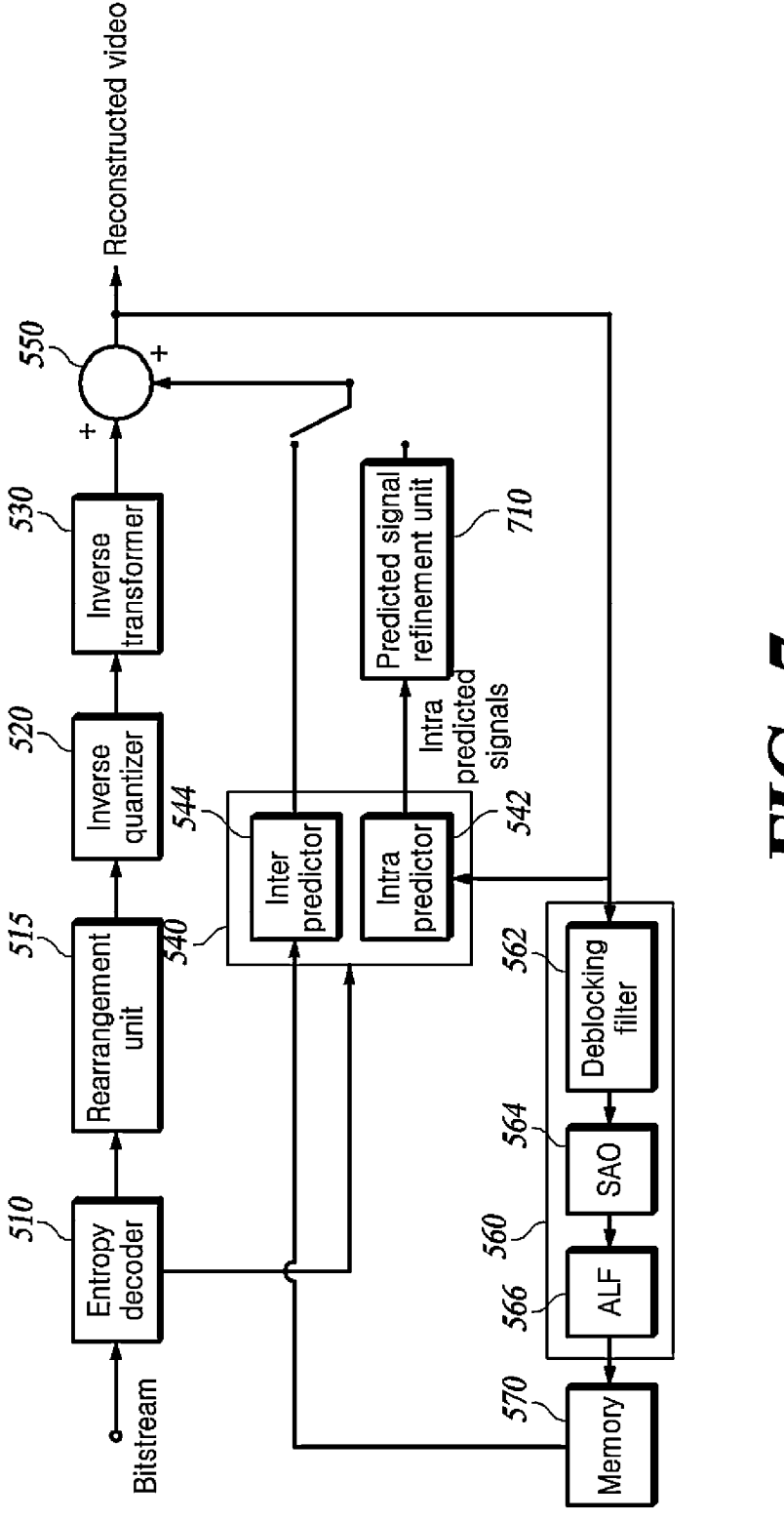
FIG. 7 is an illustrative block diagram of a video decoding device using refinement of an intra predicted signal, according to an embodiment of the present disclosure.

FIG. 7 is an illustrative block diagram of a video decoding device using refinement of an intra predicted signal, according to an embodiment of the present disclosure.

The video decoding device according to the present embodiment additionally includes a predicted signal refinement unit 710 at the rear of the intra predictor 542, which is an existing component.

The entropy decoder 510 decodes the residual block including the intra prediction mode of the current block to be decoded from the bitstream and residual values.

The intra predictor 542 generates a prediction block including predicted signals for the current block from neighboring reference samples by using the intra prediction mode for the current block to be decoded.

The predicted signal refinement unit 710 generates a refined block from the prediction block and neighboring reconstructed reference samples using the refinement model. The video decoding device generates a reconstructed block for the current block by adding residual values to the refined block.

Hereinafter, the refinement model within the video encoding device and a learning method thereof is described. The following description may be equally applied to the refinement model within the video decoding device.

As a deep learning network that refines a prediction block, a refinement model f may be expressed by Equation 1.

$$x_{hat\_p} = f(x_p, x_r) \qquad \text{[Equation 1]}$$

The refinement model f receives a prediction block $x_p$ generated by intra prediction and the neighboring reconstructed reference samples $x_r$ as input and generates a refined prediction block $x_{hat\_p}$.

Meanwhile, the training unit updates parameters of the refinement model so that the refinement model may learn how to generate an output close to the original block $y_p$ based on a loss function L as shown in Equation 2 and thus may train the refinement model.

$$L = \Sigma |y_p - x_{hat\_p}| \qquad \text{[Equation 2]}$$

Here, the loss function shown in Equation 2 uses a L1 loss between the prediction block and the original block but is not necessarily limited thereto. In other words, any loss function that may express a difference between the prediction block and the original block may be used.

In the present embodiment, after defining an adaptive refinement model f in the block as in Equation 3, the training unit may train a different refinement model using the loss function shown in Equation 2 according to the information of the block for learning.

$$x_{hat\_p} = f(x_p, x_r, m, b, l, p, q) \qquad \text{[Equation 3]}$$

Here, m, b, l, p, and q denote the information of the block. M denotes the intra prediction mode of the block, and b denotes the size or aspect ratio (a ratio of length to width) of the block. l denotes whether the block is a luma block or a chroma block, and p denotes a picture type in which the block is included. q denotes a quantization parameter (QP) of the block.

Thereafter, the video encoding device may generate a refined block by applying a differently trained refinement model based on the information of the current block transmitted from a high level.

In the following embodiments, applying a different refinement model f means outputting a block having a different value using a different filter. It also includes the meaning of applying or not applying f. Here, not applying f has the same meaning as applying f, which operates like an identity matrix, output an input signal as it is without changing the input signal.

Hereinafter, embodiments according to block information m, b, l, p, and q are described. Meanwhile, one or more embodiments may be combined. In other words, all or some of the information m, b, l, p, and q of the block may be used. Here, the block may represent a block for learning in a training process or the current block in the intra prediction process.

The video encoding device may apply a different f depending on whether the prediction mode m is directional. The video encoding device may apply a different f depending on whether the prediction mode m is matrix-based prediction, such as MIP. The video encoding device may apply a different f depending on whether prediction mode m is included in WAIP. The video encoding device may cluster the directional prediction mode m and apply a different f depending on which cluster the directional prediction mode m is included in among the vertical mode, the horizontal mode, and the diagonal mode. In addition, the video encoding device may apply a different f based on whether the prediction mode m is vertical prediction or horizontal prediction.

If b is a horizontal or vertical length of a block, the video encoding device may compare b with a preset threshold and apply a different f according to the result. If b is the aspect ratio of the block, the video encoding device may compare it with a preset threshold and apply a different f according to the result.

The video encoding device may apply a different f depending on the value l, i.e., whether the block is a luma block or a chroma block.

The video encoding device may apply different f depending on the type of p, i.e., whether the picture is an I (Intra), B (Bi-predictive), or P (Predictive) picture.

The video encoding device may apply a different f depending on the value q, i.e., a QP value or a range thereof.

Hereinafter, a structure and operation of the refinement model for refining the prediction block are described.

Figure 8:
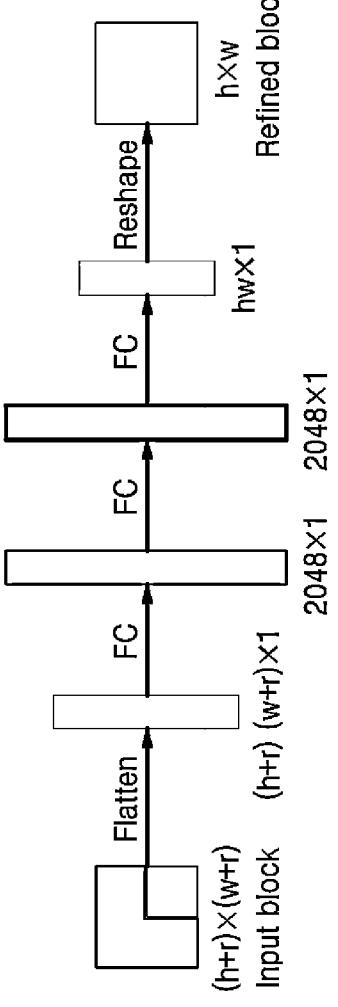
FIG. 8 is an illustrative diagram illustrating a refinement model including fully-connected layers, according to an embodiment of the present disclosure.

FIG. 8 is an illustrative diagram illustrating a refinement model including fully-connected layers, according to an embodiment of the present disclosure.

As shown in FIG. 8, the refinement model may be a deep learning network including three fully-connected (FC) layers. Behind each fully-connected layer, there is a rectified linear unit (ReLU) layer. As input of the refinement model, an input block having a size (h+r)×(w+r) including a prediction block determined according to the intra prediction mode and neighboring reconstructed reference samples are used. Here, h is the height (vertical length) of the current block, and w is the width (horizontal length) of the current block. In addition, r represents the width of the left reconstructed reference samples or the height of the top reconstructed reference samples. These reference samples may be located at the left and top of the current block.

The input block is flattened into a one-dimensional vector having a size of (h+r)(w+r)×l and then input into the refinement model. The refinement model outputs a one-dimensional vector having a size of hw×l, and a refined block may be generated by finally reshaping the one-dimensional vector. Here, when the refinement model is trained based on a prediction block generated according to a specific intra prediction mode, such as vertical prediction, horizontal prediction, or matrix-based prediction like MIP, the prediction block is refined to suit the characteristics of this prediction mode.

Meanwhile, in the case of using a refinement model having the structure illustrated in FIG. 8, the block having the size of (h+r)×(w+r) is not input as is, and input samples may be selected differently depending on the intra prediction mode.

Figure 9A:
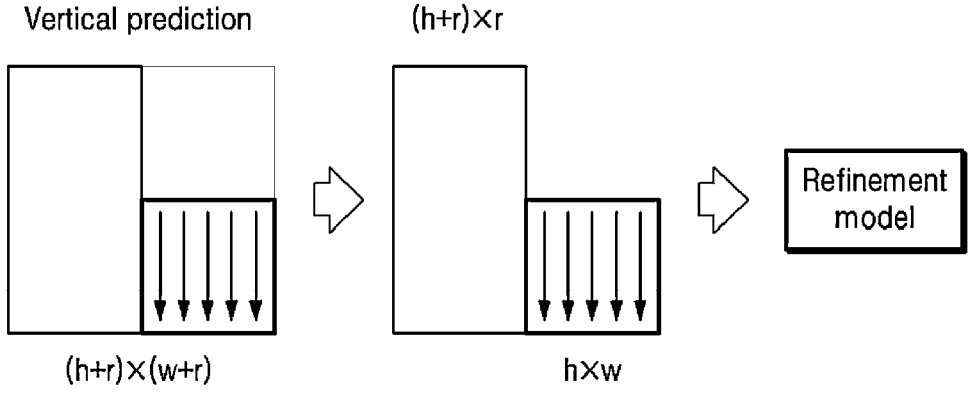
FIGS. 9A and 9B are illustrative diagrams illustrating input samples for an intra prediction mode, according to an embodiment of the present disclosure.
Figure 9A:
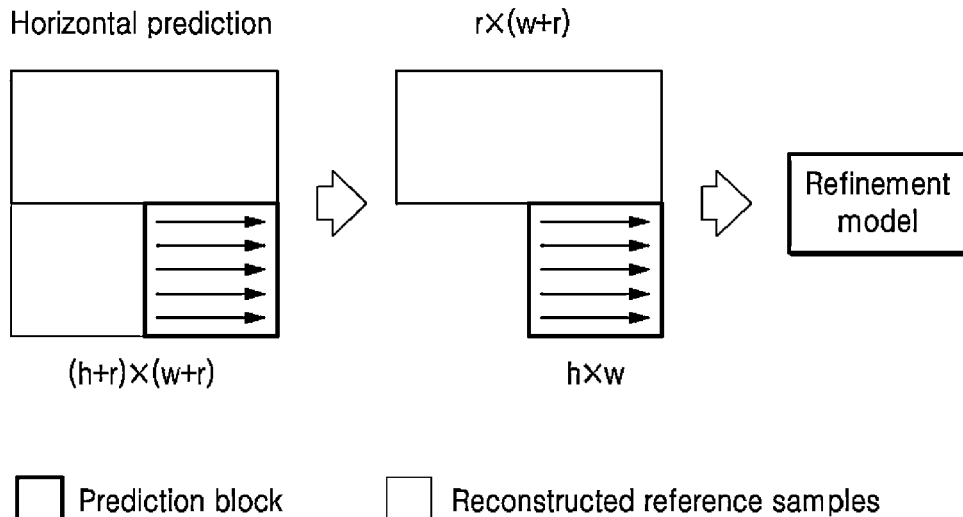
Figure 9B:
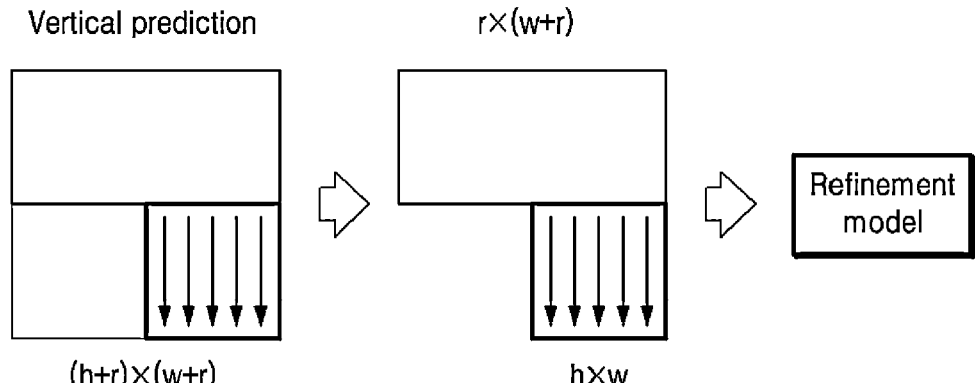
Figure 9B:
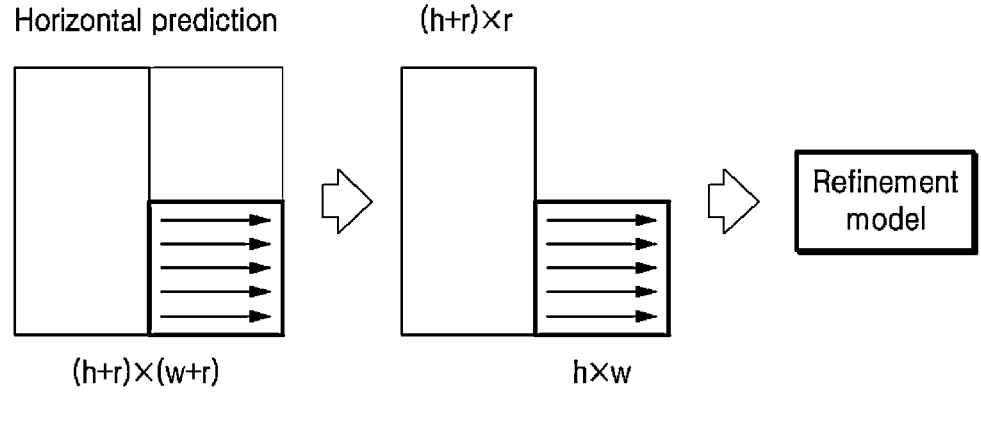

FIGS. 9A and 9B are illustrative diagrams illustrating input samples for intra prediction mode according to an embodiment of the present disclosure.

Input samples of the refinement model may be selected according to the intra prediction mode, as illustrated in FIG. 9A.

In the case of vertical prediction, a prediction block is generated using the top reference samples. Therefore, the left reference samples having a size of (h+r)×r, which were not used when generating a prediction block, and a prediction block having a size of h×w may be used as input of the refinement model.

Meanwhile, in the case of horizontal prediction, a prediction block is generated using left reference samples. Therefore, the top reference samples having a size of r×(w+r), which were not used when generating a prediction block, and a prediction block having the size of h×w may be used as input of the refinement model.

Alternatively, as in the example of FIG. 9B, input samples may be selected conversely.

In the case of vertical prediction, a prediction block is generated using the top reference samples. Accordingly, the top reference samples having the size of r×(w+r) and the prediction block having the size of h×w may be used as input of the refinement model.

Meanwhile, in the case of horizontal prediction, a prediction block is generated using left reference samples. Accordingly, the left reference samples having the size of (h+r)×r and the prediction block having the size of h×w may be used as input of the refinement model.

As another example, for vertical prediction and horizontal prediction, the left reference samples having the size of (h+r)×r adjacent to the current block, the top reference samples having the size of (w×r) adjacent to the current block, and the prediction block having the size of h×w may be used as input of the refinement model.

Figure 10:
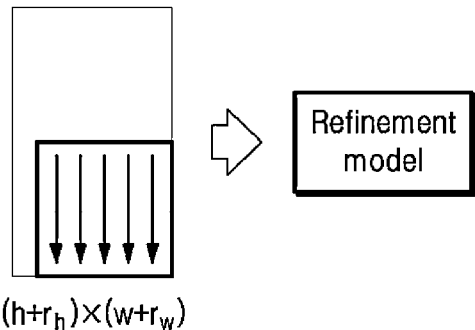
FIG. 10 is an illustrative diagram illustrating input samples for an intra prediction mode, according to another embodiment of the present disclosure.
Figure 10:
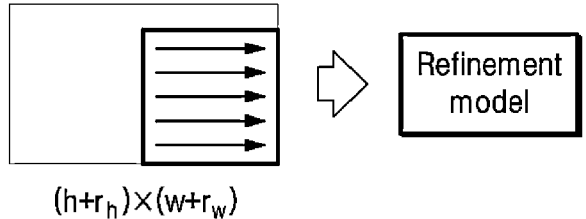

Based on the methods described above, as in the example of FIG. 10, the number of left and top reference samples may be set to be different for the vertical directional mode or the horizontal directional mode. In the example of FIG. 10, $r_w$ represents the number of left reference sample lines based on the prediction block, and $r_h$ represents the number of lines of the top reference sample.

In the case of vertical prediction, the input of the refinement model may be composed so that the top reference sample line used when generating the input block is equal to or greater than the left reference sample line ($r_h \geq r_w$). In other words, the left reference samples having the size of (h+$r_h$)× $r_w$, the top reference samples having the size of $r_h$×w, and the prediction block having the size of h×w may be used as input of the refinement model.

Meanwhile, in the case of horizontal prediction, the input of the refinement model may be composed so that the left reference sample line used when generating the input block is equal to or greater than the top reference sample line ($r_h \leq r_w$). In other words, top reference samples having the size of $r_h$×(w+$r_w$), left reference samples having the size of h×$r_w$, and prediction blocks having the size of h×w may be used as input of the refinement model.

Figure 11:
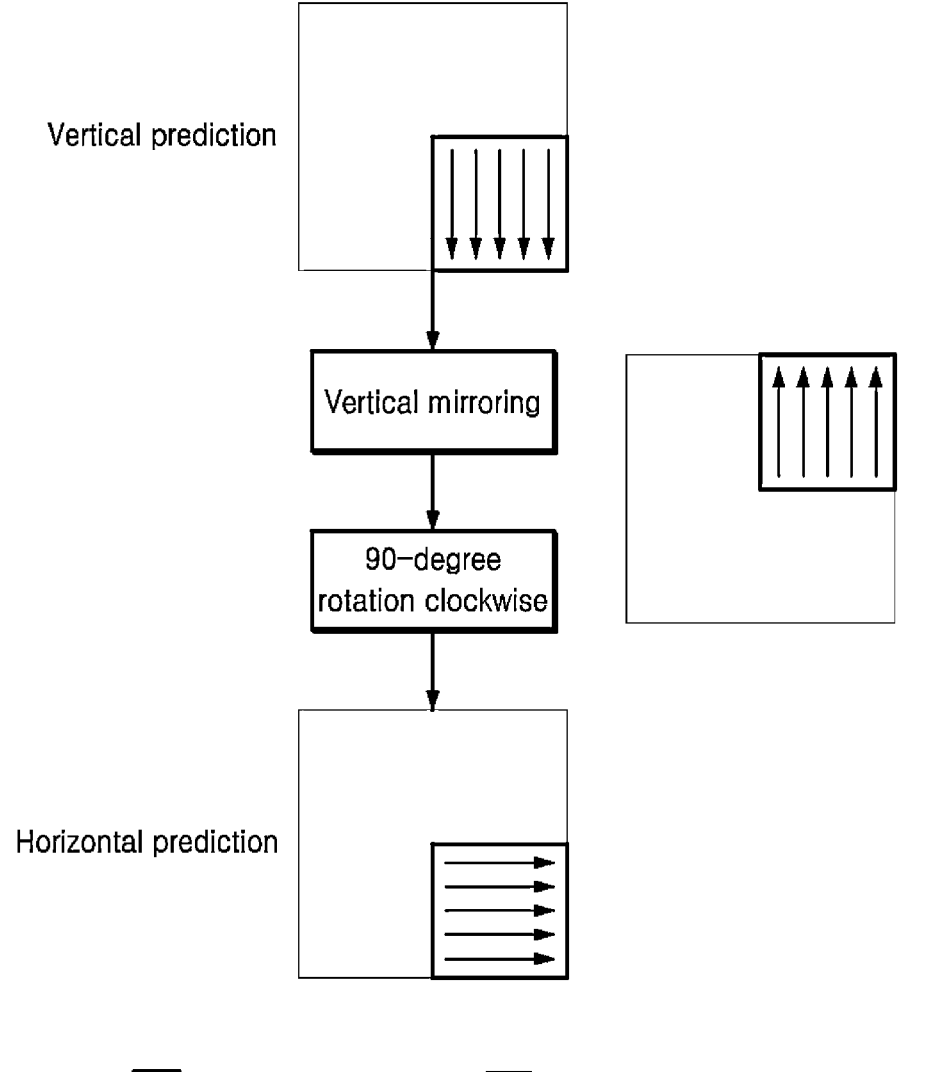
FIG. 11 is an illustrative diagram illustrating a refinement model using a preprocessing process, according to an embodiment of the present disclosure.

As another example, when using the refinement model illustrated in FIG. 8, the block having the size of (h+r)×(w+r) may not input as is, but a preprocessing process, such as rotation may be applied depending on the prediction mode. For example, as shown in the example of FIG. 11, a horizontal prediction block may be generated by applying vertical mirroring and 90-degree clockwise rotation to a vertical prediction block in the directional mode during intra prediction. Using the preprocessing process and the refinement model adaptively trained for the horizontal prediction block, the video encoding device may perform filtering of the vertical prediction block.

As another example, when an arbitrary directional prediction mode is applied to the refinement model illustrated in FIG. 8, the sample(s) used in the intra prediction mode while being included in the reference sample line are included in the input block of the refinement model. For example, In the MRLP, the first, second, and third lines from the top and left of the prediction block may be reference sample lines of the current block.

Figure 12:
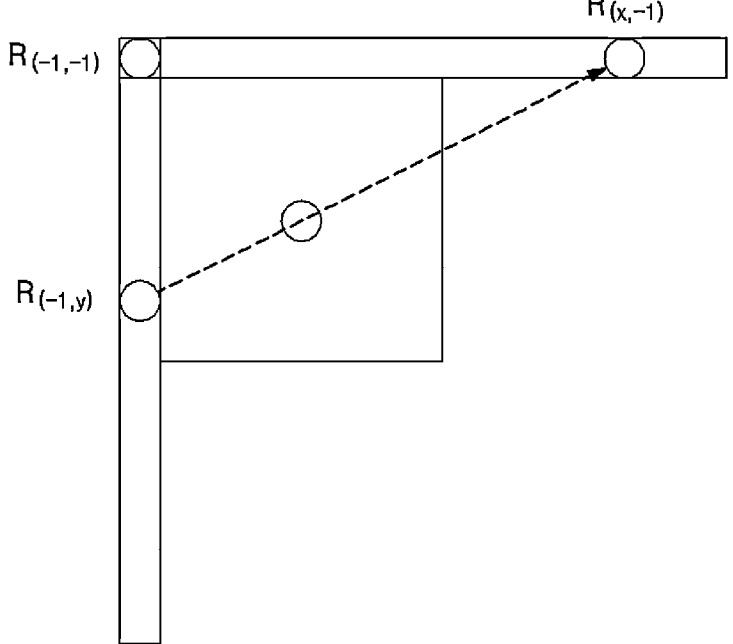
FIG. 12 is an illustrative diagram illustrating determination of reference samples for input, according to an embodiment of the present disclosure.

As another example, as illustrated in FIG. 12, a reference sample in an upper direction is determined using a determined left sample and a directional mode, and then the determined sample is included in an input block of the refinement model. Similarly, after a reference sample in the left direction is determined using the top sample and the directional mode, the determined sample is included in the input block of the refinement model.

As another example, when an arbitrary directional prediction mode is applied to the refinement model illustrated in FIG. 8, the prediction mode may be mapped to a closer one of the horizontal or vertical directions, depending on the slope of the directionality. Thereafter, reference samples may be determined in the manner illustrated in FIGS. 9A, 9B, and 10.

As another example, in the case of using the refinement model illustrated in FIG. 8, it is possible to select input samples differently instead of inputting the block having the size of (h+r)×(w+r) as is, but some samples may be padded and then input. For example, if reference samples cannot be included at a block boundary of a CTU, other available reference samples may be included instead, or some of the samples constituting the prediction block may be included in the input of the refinement model.

As another example, in the case of using the refinement model illustrated in FIG. 8, the video encoding device may signal a flag indicating whether to use parameters of a previously trained refinement model to the video decoding device. Here, the video decoding device may perform filtering on the prediction block by combining the parameters of a predetermined refinement model and the flag.

As another example, in the case of using the refinement model illustrated in FIG. 8, instead of receiving the flag indicating whether to use the parameters of the previously trained refinement model from the video encoding device, the video decoding device may determine whether to use the refinement model according to previously received encoding information. In other words, the video decoding device performs filtering by combining the predetermined parameters and conditions determined according to all or some of the information m, b, l, p, and q of the current block. For example, if the prediction mode m of the current block is a vertical mode or a horizontal mode, the video decoding device may apply the refinement model.

As another example, in the case of using the refinement model illustrated in FIG. 8, the video encoding device may use one of various refinement models rather than one refinement model. Therefore, the video encoding device may transmit an index indicating one of a plurality of refinement models, and the video decoding device may combine the received index and the flag indicating whether to use the parameters of the refinement model and perform filtering on the prediction block.

As another example, in the case of using the refinement model illustrated in FIG. 8, the video encoding device may select one of various refinement models rather than using one refinement model. Here, the video encoding device may determine which refinement model to use among the plurality of refinement models according to the encoding information of the current block previously transmitted from a high level. Similarly, the video decoding device may determine one refinement model among a plurality of refinement models according to all or some of the information m, b, l, p, and q of the current block, and perform filtering on the prediction block.

As another example, in the case of using the refinement model illustrated in FIG. 8, the video encoding device may transmit all or some of the parameters of refinement model individually trained for each sequence to the video decoding device. Here, some parameters may be parameters constituting some layers of the refinement model or may represent parameters such as offsets, in a filter. Here, instead of using predetermined parameters, the video decoding device may configure a refinement model with parameters received through a bitstream and then perform filtering on the prediction block.

The description given above may be equally applied to a refinement model within the video decoding device.

Figure 13:
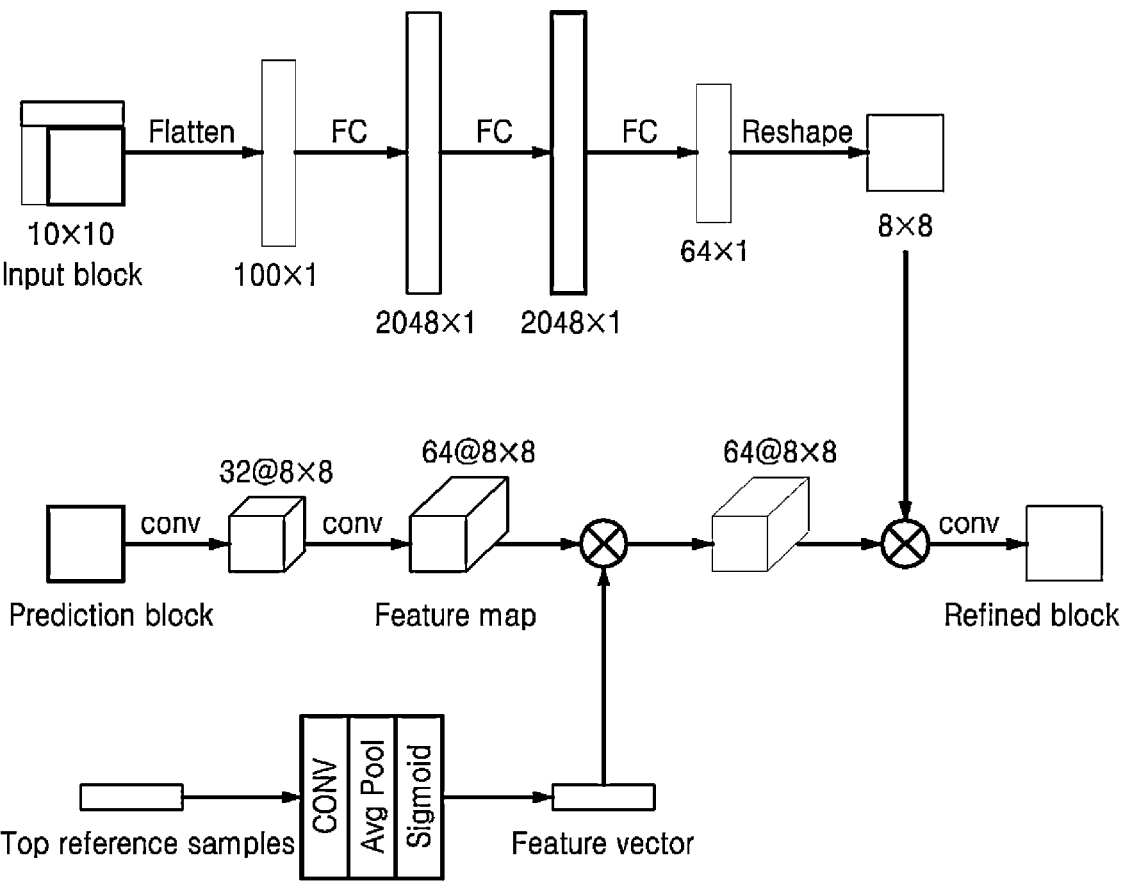
FIG. 13 is an illustrative diagram illustrating an extended refinement model according to another embodiment of the present disclosure.

FIG. 13 is an illustrative diagram illustrating an extended refinement model according to another embodiment of the present disclosure.

The refinement model may be extended by adding a convolution layer and spatial attention to the refinement model as illustrated in FIG. 8. The extended refinement model may solve the problem that information of reference samples in other direction is not used when performing intra prediction using the existing directional mode. For example, as illustrated in FIG. 13, the extended refinement model may be applied to an 8×8 prediction block determined according to horizontal direction prediction among directional modes. By multiplying a feature map obtained by inputting a prediction block into a convolutional layer, a feature vector generated from reference samples at the top of the prediction block, and the block generated by the refinement model illustrated in FIG. 8 together, a refined block in which information of reference samples in other direction is considered may be generated. In the example of FIG. 13, components that generate feature vectors include a convolutional layer, a pooling layer, and an activation layer. The extended refinement model may reflect the characteristics of the top reference samples using an attention structure on the prediction block predicted in the horizontal direction based on the left reference samples. Finally, the extended refinement model illustrated in FIG. 13 may generate a refined prediction block.

Figure 14:
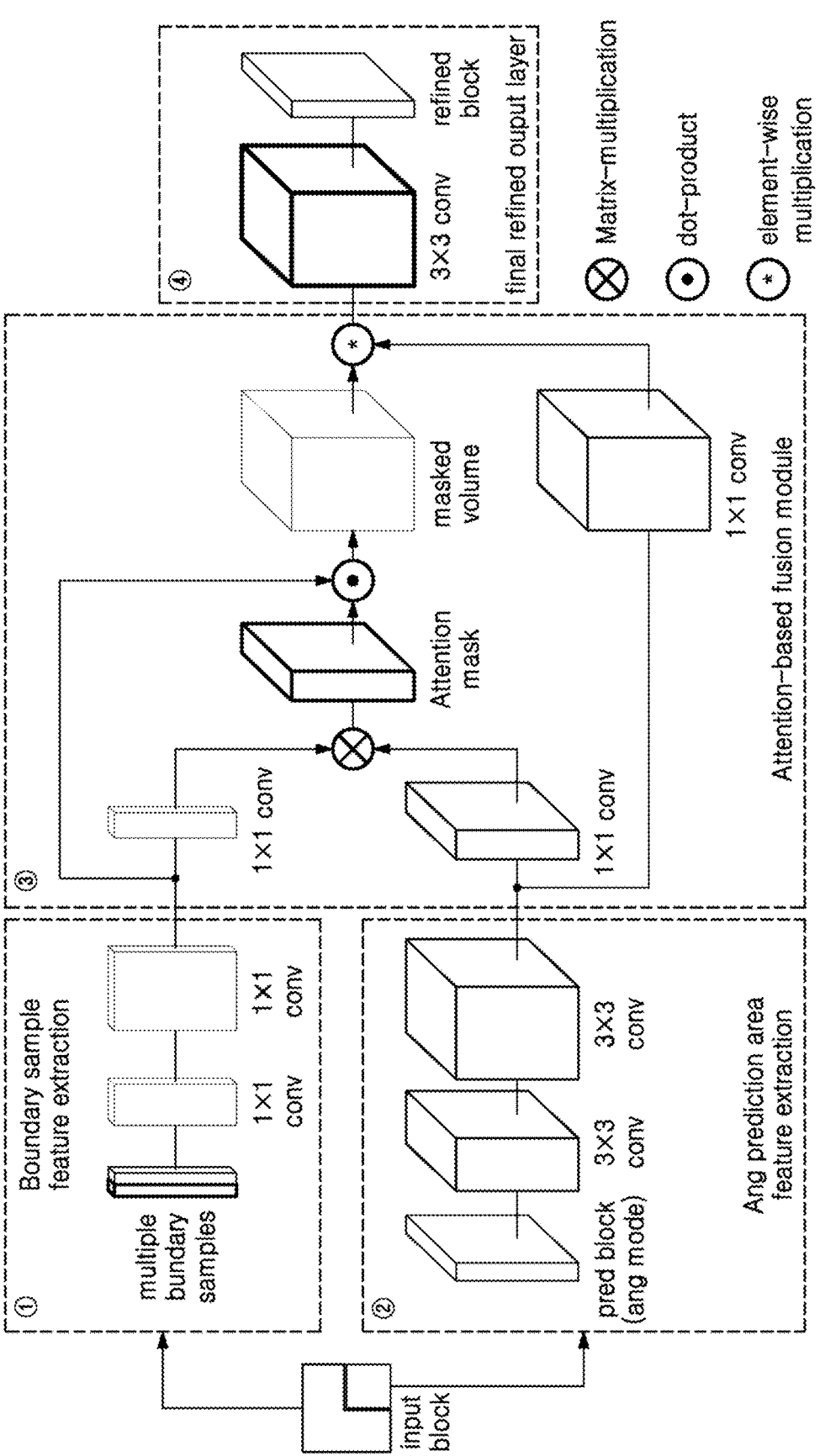
FIG. 14 is an illustrative diagram illustrating an adaptive refinement model that operates adaptively in a directional mode of intra prediction, according to another embodiment of the present disclosure.

FIG. 14 is an illustrative diagram illustrating an adaptive refinement model that operates adaptively in the directional mode of intra prediction, according to another embodiment of the present disclosure.

The adaptive refinement model illustrated in FIG. 14 includes the following four components. A first component ① extracts features from multiple boundary samples. This component is a 1×1 convolutional layer that extracts features from reference sample lines around the prediction block. A second component ② extracts the features of the prediction block. As described above, the angle prediction area predicted in the directional mode may express approximate structural information of the current block. Therefore, features corresponding to structural information are extracted using a convolutional layer for the prediction block predicted in the directional mode.

A third component ③ fuses the features extracted from the first and second components using an attention structure. Here, the attention structure allows effective use of spatial information by controlling the contribution of neighboring reference samples when refining each pixel of the prediction block. Finally, a fourth component ④ is an output layer, which generates a refined block from the output of the third component using the convolutional layer.

Figure 15:
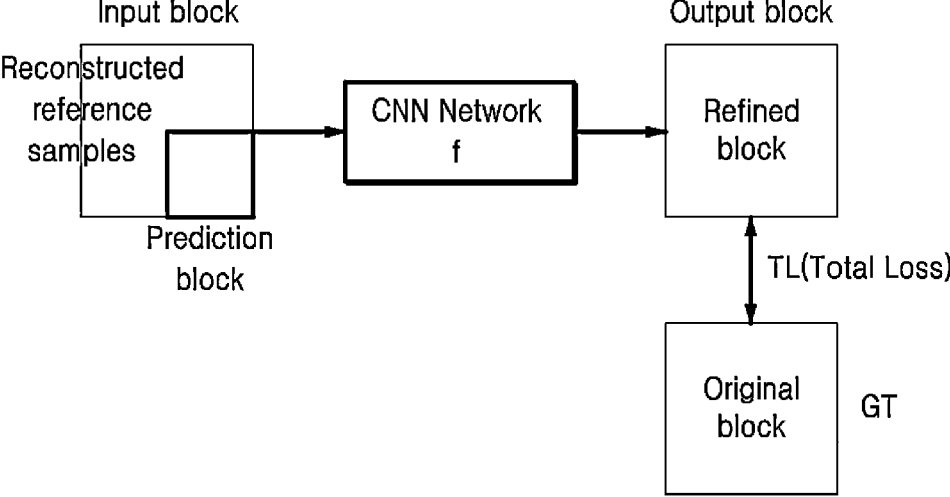
FIG. 15 is an illustrative diagram illustrating a convolutional neural network (CNN)-based refinement model, according to an embodiment of the present disclosure.

FIG. 15 is an illustrative diagram illustrating a CNN-based refinement model according to an embodiment of the present disclosure.

The convolutional neural network (CNN)-based refinement model may improve the image quality of the current block by performing CNN-based image quality refinement by using a prediction block and neighboring reconstructed reference samples as input. In the example of FIG. 15, the input block includes neighboring reconstructed reference samples and prediction samples. Here, the neighboring reference samples may include a coding error, and the prediction samples may include a prediction error and a coding error. In addition, the CNN-based refinement model generates an output block having the same size as the input block. Therefore, the training unit may utilize a total loss function (TL), such as shown in Equation 4 during training of the CNN network.

$$TL = \alpha \cdot L(\text{output}_{blk}, GT_{blk}) + (1-\alpha)L(\text{output}_{blk} \cdot \text{mask}, GT_{blk} \cdot \text{mask}) \qquad \text{[Equation 4]}$$

Here, a mask is a matrix in which the size of the mask is the same as that of the input block and a mask value is 1 for the prediction sample and 0 for the rest. Ground truth (GT) represents a target block for learning. The training unit may calculate loss for each of the neighboring reference samples and prediction samples and then may use the weighted sum using weights as overall loss. By setting the weight α to be in inverse proportion to the sum of the areas of the neighboring reference samples and the areas of the prediction samples, the importance of the second item in Equation 4 may be refined. This CNN-based refinement model has the advantage of being able to operate even if the size of the input block changes.

Hereinafter, a video encoding method and an video decoding method of refining an intra predicted signal based on deep learning are described using the illustrations of FIGS. 16 and 17.

Figure 16:
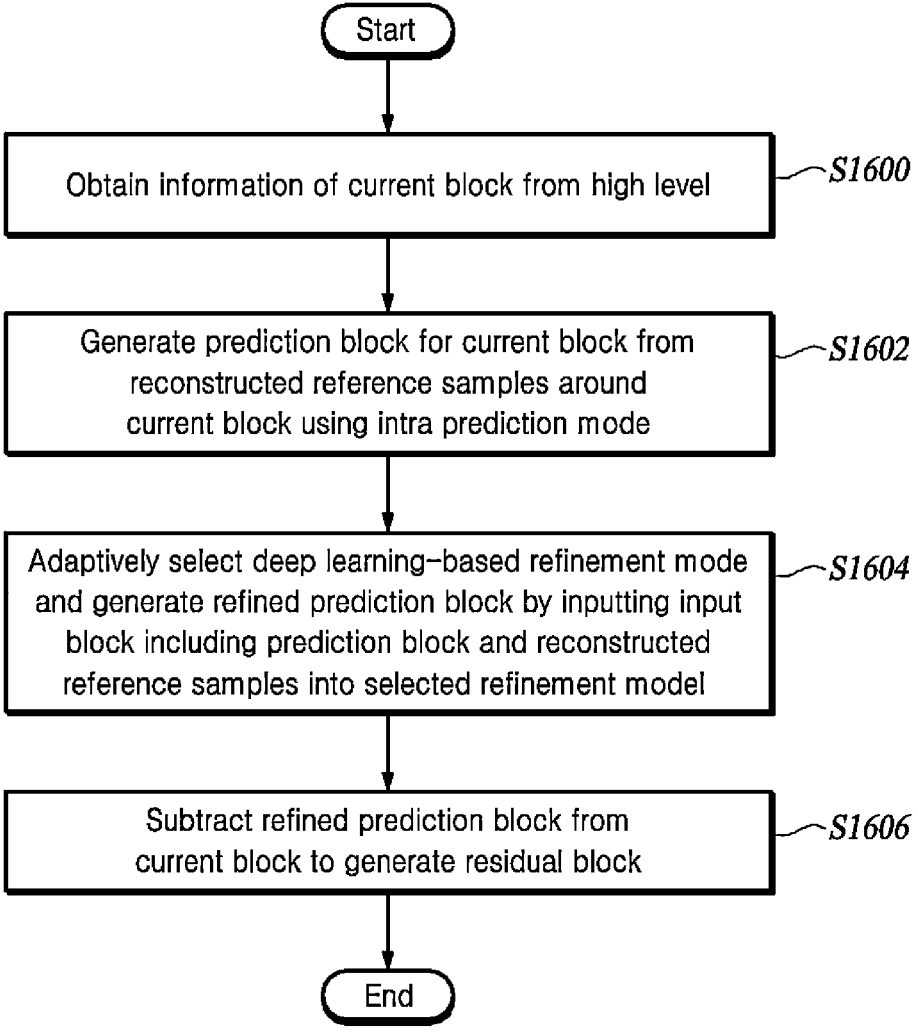
FIG. 16 is a flowchart illustrating a video encoding method using refinement of intra predicted signals, according to an embodiment of the present disclosure.

FIG. 16 is a flowchart illustrating a video encoding method using refinement of intra predicted signals according to an embodiment of the present disclosure.

The video encoding device obtains information of a current block from a high level (S1600). Here, the information of the current block includes the intra prediction mode m of the current block, information b on the height, width, or aspect ratio of the current block, a color 1 of the current block, a type p of the current picture including the current block, and a quantization parameter q of the current block.

The video encoding device generates a prediction block for the current block from the reconstructed reference samples around the current block using the intra prediction mode (S1602).

The video encoding device adaptively selects a deep learning-based refinement model based on all or part of the information of the current block and generates a refined prediction block by inputting an input block including the prediction block and the reconstructed reference samples into the selected refinement model (S1604).

For the block-adaptive refinement model f, as shown in Equation 3, the training unit may pre-train different refinement models according to the information of the block for learning. Thereafter, based on the input information of the current block, the video encoding device may generate a refined prediction block by applying the input block to a differently trained refinement model.

Hereinafter, embodiments according to information m, b, 1, p, and q of the current block are described. Meanwhile, one or more embodiments may be combined. In other words, all or some of the information m, b, 1, p, and q of the current block may be used.

For example, the video encoding device may apply a different refinement model depending on whether the prediction mode m is directional. The video encoding device may apply a different refinement model based on whether the prediction mode m is matrix-based prediction, such as the MIP. The video encoding device may apply a different refinement model based on whether the prediction mode m is included in the WAIP. For the directional prediction mode m, the video encoding device may cluster m and may apply a different refinement model based on which cluster the directional prediction mode m is included in among the vertical mode, the horizontal mode, and the diagonal mode.

In addition, the video encoding device may apply different refinement models based on whether the prediction mode m is vertical prediction or horizontal prediction.

If b is a horizontal or vertical length of the current block, the video encoding device may compare b with a preset threshold and may apply a different refinement model according to the result. If b is the aspect ratio of the current block, the video encoding device may compare b with a preset threshold and apply a different refinement model according to the result.

The video encoding device may apply a different refinement model depending on the value l, i.e., whether the current block is a luma block or a chroma block.

The video encoding device may apply a different refinement model depending on the type of p, i.e., whether the current picture is a picture I, B, or P.

The video encoding device may apply a different refinement model based on the value q, i.e., a QP value of the current block or a range thereof.

Meanwhile, the video encoding device may signal a flag indicating whether to use the parameters of a previously trained refinement model to the video decoding device. Here, the video decoding device may perform filtering on the prediction block by combining the parameters of the predetermined refinement model and the flag.

As described above, a video encoding device may not use a single refinement model but may use one of various refinement models. Therefore, the video encoding device may transmit an index indicating one of a plurality of refinement models, and the video decoding device may combine the received index and a flag indicating whether to use the parameters of the refinement model and may perform filtering on the prediction block.

As another example, the video encoding device may transmit all or some of the parameters of refinement models individually trained for each sequence to the video decoding device. Here, some parameters may be parameters constituting some of the refinement model, or may represent parameters such as offsets, in a filter. Here, instead of using predetermined parameters, the video decoding device may configure a refinement model with parameters received through a bitstream and then perform filtering on the prediction block.

The video encoding device subtracts the refined prediction block from the current block to generate a residual block (S1606).

Figure 17:
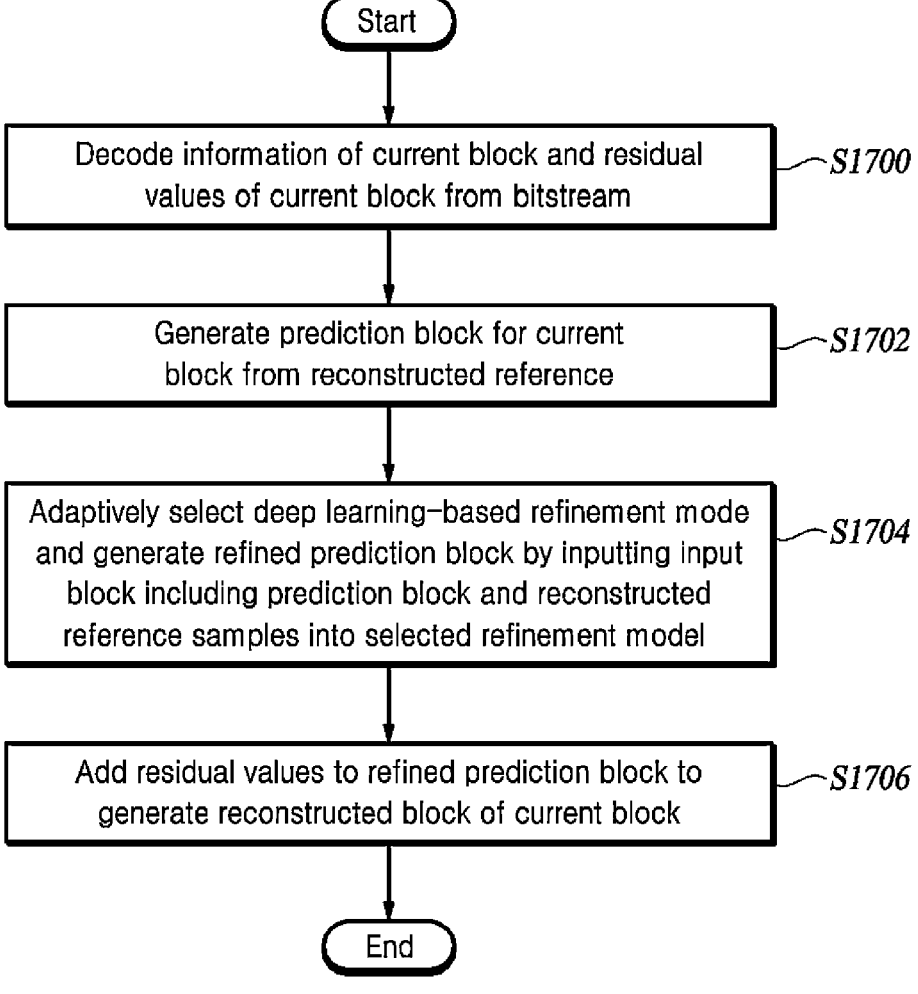
FIG. 17 is a flowchart illustrating a video decoding method using refinement of intra predicted signals, according to an embodiment of the present disclosure.

FIG. 17 is a flowchart illustrating a video decoding method using refinement of intra predicted signals, according to an embodiment of the present disclosure.

The video decoding device decodes information of the current block and residual values of the current block from the bitstream (S1700). The information of the current block includes intra prediction mode m of the current block, information b about the height, width or aspect ratio of the current block, color l of the current block, type p of a current picture including the current block, and quantization parameter q of the current block.

The video decoding device generates a prediction block for the current block from the reconstructed reference samples around the current block by using the intra prediction mode (S1702).

The video decoding device adaptively selects a deep learning-based refinement model based on all or part of the information of the current block and generates a refined prediction block by inputting an input block including the prediction block and the reconstructed reference samples into the selected refinement model (S1704).

The refinement model is adaptively trained in advance according to the information of the block for learning by the training unit.

Meanwhile, the embodiments in which the video decoding device adaptively selects a refinement model according to the information m, b, l, p, and q of the current block are the same as the embodiments of the video encoding device, so further detailed description is omitted.

The video decoding device adds residual values to the refined prediction block to generate a reconstructed block of the current block (S1706).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor
510: entropy decoder
542: intra predictor
610: predicted signal refinement unit
710: predicted signal refinement unit

What is claimed is:
1. A video decoding device comprising:
an entropy decoder configured to obtain an intra prediction mode of a current block and residual values of the current block by decoding a bitstream;

an intra predictor configured to generate a prediction block for the current block from reconstructed reference samples around the current block using the intra prediction mode;

a predicted signal refinement unit configured to:

adaptively select a deep learning-based refinement model, among multiple pre-trained deep learning-based refinement models, based on the intra prediction mode of the current block;

generate an input block from the prediction block and the reconstructed reference samples; and generating a refined prediction block by inputting the input block into the selected deep learning-based refinement model; and an adder configured to add the residual values to the refined prediction block to generate a reconstructed block of the current block, wherein the adaptively selecting of the deep learning-based refinement model is performed depending on whether the intra prediction mode is a directional mode, whether the intra prediction mode is a matrix-based prediction mode, or whether the intra prediction mode is included in wide-angle intra prediction (WAIP).

2. The video decoding device of claim 1, wherein, when the intra prediction mode is a directional mode, the predicted signal refinement unit is configured to cluster the intra prediction mode and adaptively select the deep learning-based refinement model based on which cluster the intra prediction mode is included among a vertical mode, a horizontal mode, and a diagonal mode.

3. The video decoding device of claim 1, wherein the predicted signal refinement unit is configured to adaptively select the deep learning-based refinement model based on whether the intra prediction mode is vertical prediction or horizontal prediction.

4. The video decoding device of claim 1, wherein the deep learning-based refinement model is a deep learning network including fully-connected layers and is adaptively trained in advance according to information of learning blocks.

5. The video decoding device of claim 4, wherein the predicted signal refinement unit is configured to change the input block into a one-dimensional vector, input the one-dimensional vector to the deep learning-based refinement model, and reshape the one-dimensional vector generated by the deep learning-based refinement model to a size of the prediction block.

6. The video decoding device of claim 4, wherein the predicted signal refinement unit is configured to compose an input block having a size of $(h+r) \times (w+r)$ using the prediction block and the reconstructed reference samples, wherein h is a height of the current block, w is a width of the current block, and r is a height of top reconstructed reference samples or a width of left reconstructed reference samples.

7. The video decoding device of claim 6, wherein, when the intra prediction mode is vertical prediction, the predicted signal refinement unit is configured to compose the input block using left reconstructed reference samples having a size of $(h+r) \times r$ and a prediction block having a size of $h \times w$, and when the intra prediction mode is horizontal prediction, the predicted signal refinement unit is configured to compose the input block using top reconstructed reference samples having a size of $r \times (w+r)$ and a prediction block having a size of $h \times w$.

8. The video decoding device of claim 4, wherein the predicted signal refinement unit is configured to compose an input block having a size of $(h+r_h) \times (w+r_w)$ using the prediction block and the reconstructed reference samples, wherein h is a height of the current block, w is a width of the current block, $r_h$ is a height of top reconstructed reference samples, and $r_w$ is a width of left reconstructed reference samples.

9. The video decoding device of claim 8, wherein, when the intra prediction mode is vertical prediction, the predicted signal refinement unit is configured to compose the input block so that $r_h$ is greater than or equal to $r_w$, and when the intra prediction mode is horizontal prediction, the predicted signal refinement unit is configured to compose the input block so that $r_w$ is greater than or equal to $r_h$.

10. The video decoding device of claim 4, wherein, when the intra prediction mode is a directional mode, the predicted signal refinement unit is configured to map the intra prediction mode to whichever is closer to horizontal prediction or vertical prediction depending on a slope of the directional mode.

11. A video encoding method of performing intra-prediction on a current block, the method comprising:

determining an intra prediction mode of the current block;

generating a prediction block for the current block from reconstructed reference samples around the current block using the intra prediction mode;

adaptively selecting a deep learning-based refinement model, among multiple pre-trained deep learning-based refinement models, based on the intra prediction mode of the current block;

generating an input block from the prediction block and the reconstructed reference samples;

generating a refined prediction block by inputting the input block into the selected deep learning-based refinement model; and generating a residual block by subtracting the refined prediction block from the current block, wherein the adaptively selecting of the deep learning-based refinement model is performed depending on whether the intra prediction mode is a directional mode, whether the intra prediction mode is a matrix-based prediction mode, or whether the intra prediction mode is included in wide-angle intra prediction (WAIP).

12. The video encoding method of claim 11, wherein generating the refined prediction block includes:

adaptively selecting the deep learning-based refinement model depending on whether the intra prediction mode is vertical prediction or horizontal prediction.

13. The video encoding method of claim 11, wherein the deep learning-based refinement model is a deep learning network including fully-connected layers and is adaptively trained in advance according to information of learning blocks.

14. A method for providing a video decoding apparatus with video data, the method comprising:

encoding the video data into a bitstream; and transmitting the bitstream to video decoding apparatus, wherein encoding the video data comprises:

determining an intra prediction mode of a current block;

generating a prediction block for the current block from reconstructed reference samples around the current block using the intra prediction mode;

adaptively selecting a deep learning-based refinement model, among multiple pre-trained deep learning-based refinement models, based on the intra prediction mode of the current block;

generating an input block from the prediction block and the reconstructed reference samples;

generating a refined prediction block by inputting the input block into the selected deep learning-based refinement model; and generating a residual block by subtracting the refined prediction block from the current block, wherein the adaptively selecting of the deep learning-based refinement model is performed depending on whether the intra prediction mode is a directional mode, whether the intra prediction mode is a matrix-based prediction mode, or whether the intra prediction mode is included in wide-angle intra prediction (WAIP).

\* \* \* \* \*